United States Patent [19]

Dahlin

[11] 4,041,802
[45] Aug. 16, 1977

[54] BALANCING APPARATUS, PREFERABLY FOR GRINDING WHEEL

[76] Inventor: Rolf Brorsson Dahlin, Karrgrand 49, 162 46 Vallingby, Sweden

[21] Appl. No.: 636,462

[22] Filed: Dec. 1, 1975

[30] Foreign Application Priority Data

Dec. 2, 1974  Sweden .............................. 7415037

[51] Int. Cl.² ............................................ F16F 15/22
[52] U.S. Cl. ....................................... 74/573; 51/169
[58] Field of Search ........................... 74/573; 51/169

[56] References Cited

U.S. PATENT DOCUMENTS

| 2,498,877 | 2/1950 | Candor | 74/573 X |
|---|---|---|---|
| 2,882,746 | 4/1959 | Largen | 74/573 |
| 3,177,738 | 4/1965 | Achilles | 74/573 |
| 3,468,189 | 9/1969 | Gosche | 74/573 |
| 3,581,596 | 6/1971 | Wespi | 74/573 |

FOREIGN PATENT DOCUMENTS

| 1,203,244 | 8/1970 | United Kingdom | 74/573 |

*Primary Examiner*—Samuel Scott

*Assistant Examiner*—Randall Heald

*Attorney, Agent, or Firm*—Sughrue, Rothwell, Mion, Zinn and Macpeak

[57] ABSTRACT

A balancing apparatus for a grinding wheel or the like comprises members co-rotary with the object, members non-co-rotary therewith and weights coupled to the co-rotary members and having their gravity centers arranged displaceable relative to planes through the axis of rotation of the wheel. The weights are adapted for easy rotation on or with axles extending angularly in relation to the axis of rotation, and actuating means and the weights or axles are provided with toothed elements for the rotation of the weights. The weights comprise two first weights each of disc-shape and connected to each other by a central rotation axle portion, and two second weights, each of disc-shape and connected to each other by an intermediate bow portion offset from their rotation axle. The rotation axles of the first and second weights form substantially right angles with each other and with the rotation axis of the grinding wheel. The rotation axles of the first and second weights are located substantially in the same plane.

4 Claims, 3 Drawing Figures

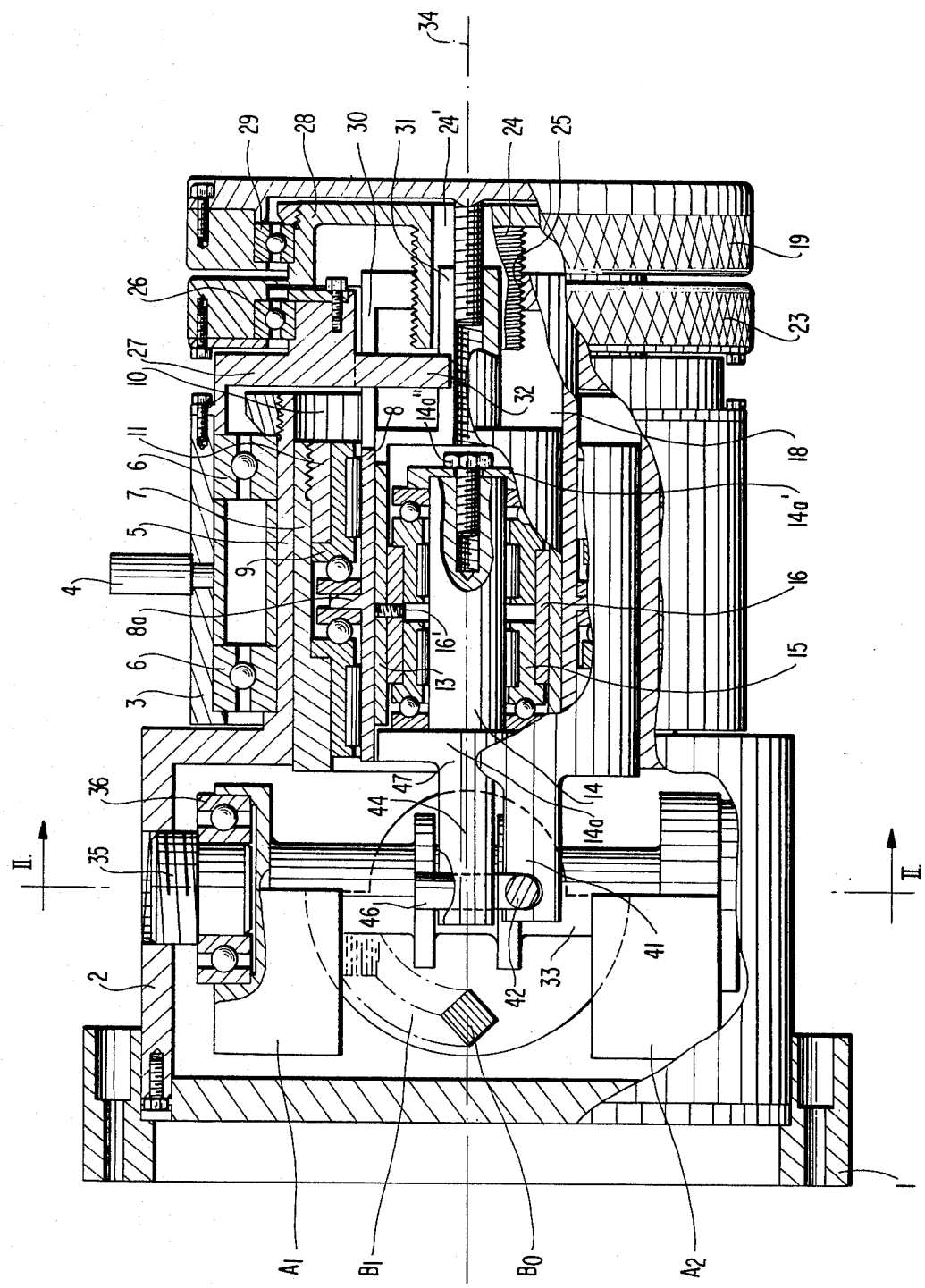

BALANCING APPARATUS, PREFERABLY FOR GRINDING WHEEL

BACKGROUND OF THE INVENTION

1. Field of the Invention

Balancing apparatus, preferably for grinding wheel

This invention relates to an apparatus at a rotatable object, preferably in the form of a grinding wheel, to render possible the balancing of the object during its rotation.

2. Prior Art

It is previously known (cf. for instance UK Pat. No. 1,203,244, German lay-open-print 1,218,754 and Swedish lay-open-print 327,837) to utilize balancing devices with grinding machines. In one known type of an apparatus forming the prior art, spring-balanced weights are used which are displaceable in the radial direction by actuation means, which by key-shaped actuating surfaces determine the degree of separation in radial direction. Due to the requirement that the grinding wheel must be capable of rotation at a relatively high speed, e.g. 5000 rpm or more, such a principle requires unacceptably high actuating forces at the balancing operation. It has also been proposed (cf. British Pat. No. 1,280,954) to utilize for the weight displacement, electric motors attached to the co-rotary members. This proposal, however, has proved to work less satisfactorily, because the electric motors did not withstand the high centrifugal forces. Another problem is the risk of vibrations if the weights are positioned too far away from the grinding wheel.

SUMMARY OF THE INVENTION

The present invention has a primary object of solving the aforesaid problems, and it includes a balancing apparatus, in which the displacement of the weights can be effected with very small actuating forces. Further, it has a small requirement for space in the axial direction of the grinding wheel.

The apparatus according to the invention is characterized in that is comprises two first weights each disc-shape and connected to each other by a central rotation axle portion, and two second weights, each disc-shape and connected to each other by an intermediate bow portion offset from their rotation axle. The rotation axles of said first and second weights form substantially right angles with each other and with the rotation axis of the rotary object, and the rotation axles of said first and second weights are located substantially in the same plane.

BRIEF DESCRIPTION OF THE DRAWINGS

An embodiment of the invention is described below, with reference to the accompanying drawings, in which FIG. 1 is a longitudinal partly sectioned view of the balancing apparatus.

In the Figures, corresponding parts have been given the same reference characters.

DESCRIPTION OF THE PREFERRED EMBODIMENT

Figure 3:
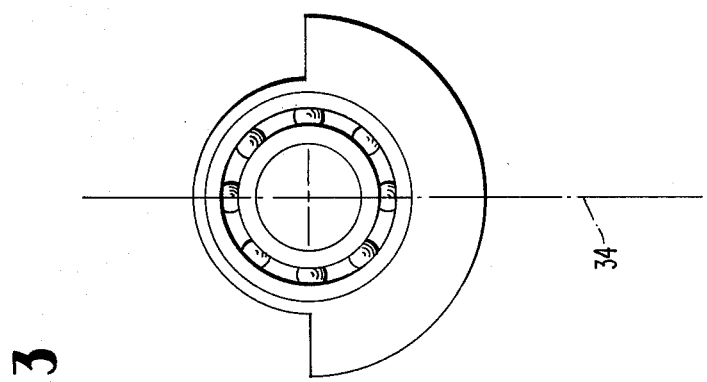
FIG. 3 is a side view of a balancing weight.

The balancing apparatus shown in FIG. 1 is intended to be attached in a known manner via a connecting flange 1 to the rotatable spindle of a grinding machine (not shown) and adjacent a grinding wheel to be provided with the balancing apparatus. The connecting flange is secured in a cylindrical rotatably mounted housing 2 for first weights $A_1$ and $A_2$ and second weights $B_0$, $B_1$ and $B_2$, the design and locations of which are dealt with in greater detail below. The apparatus further comprises a stationary frame 3 secured against rotation by means of a rotation-locking member 4 known per se which is connected to a foundation or similar stationary unit. Attached to the rotatable housing 2 is a rigid an outer rotation member 5 located within the frame portion and provided at the inner surface of the frame with a ball bearing 6 to facilitate movement with respect to the stationary frame 3. An outer slide 7 is provided displaceable in its longitudinal direction in and relative to said outer rotation member 5. The outer slide is displaceable by means of a non-rotary cylinder 8, on which the rotary outer slide 7 is mounted via bearings. The non-rotary cylinder is provided with a projecting flange 8a, having on both sides radial-axial rolling bearings 9 attached. Upon longitudinal displacement of the cylinder 8, the outer slide 7 will be displaced longitudinally relative to the member 5 in a space 10 within said member. The slide 7 is provided at one of its ends with a threaded locking ring 11 for axially holding the bearings 9.

Within the cylinder 8 an inner non-rotary slide 13 is mounted with slide fit. The inner slide is longitudinally displaceable relative to the cylinder 8. The slide 13 encloses a co-rotary rod 14 rotating together with the grinding wheel and mounted within the non-rotary slide via radial-axial roller bearings 15. As shown in FIG. 1, element $14a'$ is a locking ring secured by a screw $14a''$ in the other end of the rod 14. The rod is provided with a projecting flange 14a, and bearings 15 are so mounted that the rod and the slide are rigidly connected relative to each other in the axial direction. The slide carries at one end a threaded locking ring 16 secured by a screw $16'$ for axial holding the bearings 15. The slide 13 is movable relative to the cylinder 8 in a space 18.

The movement of the slide 13 and the rod 14, is effected by means of a first wheel 19 having a central first screw 20. The screw 20 is in engagement with an inner thread 21 disposed on a tapering portion 22 at the end of the slide 13. The outer slide 7 is displaceable via the cylinder 8 by means of a second wheel 23 having a central second screw 24. The second screw 24 is provided with a central bore $24'$, within which the first screw extends for its co-operation with the slide 13, 14. The second screw engages internal thread 25 at the rearward of the cylinder 8. Said second wheel 23 is supported by a first ball bearing 26 on a lowered portion 27 of the frame at one end thereof. The second wheel is provided with a projecting portion 28, on which the first wheel is supported by a second ball bearing 29. Upon rotation of the first wheel, the rod 14 is displaced relative to and independently of the outer slide and, in an opposite mode, upon rotation of the second wheel 23 the outer slide is displaced relative to and independently of the rod 14. The cylinder 8 and slide 13 are fixed angularly by means of key-ways 30 and 31, respectively, extending in the longitudinal direction of said parts, into which key-ways a key 32 attached to the frame is intended to project down.

As a consequence of the operation of the embodiment shown, a linear displacement is obtained between the non-rotary members 8 and 13, and a rotating linear displacement is obtained between the members 5 and 7.

Figure 2:
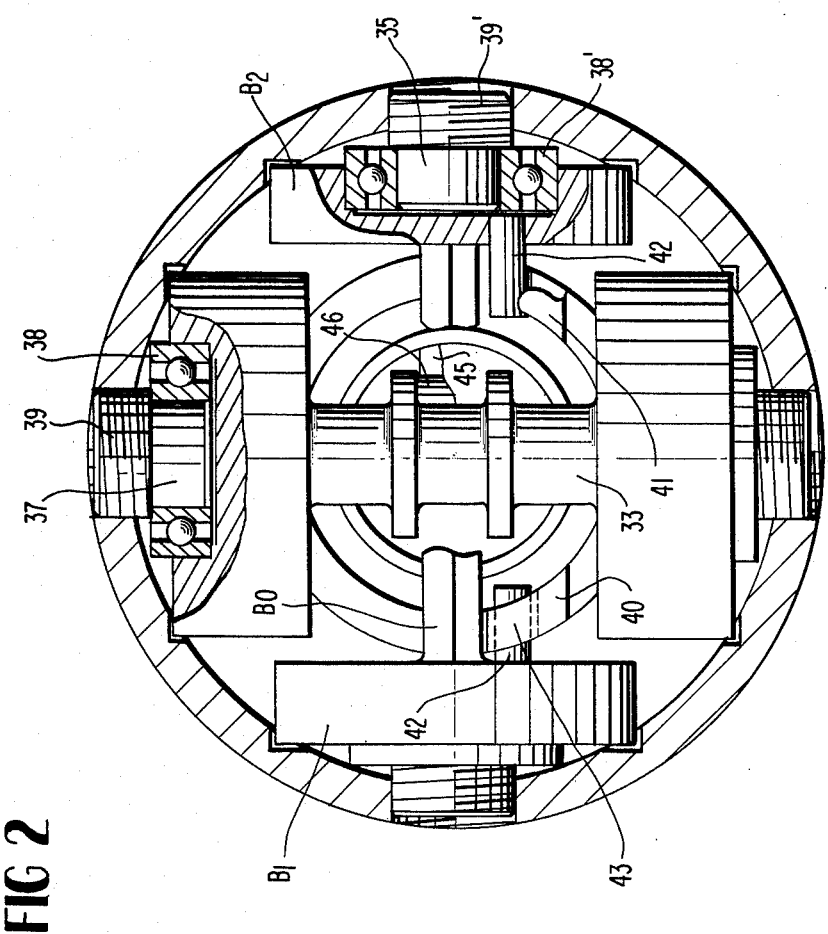
FIG. 2 shows the apparatus according to FIG. 1 partly by way of a cross-section along the line II—II in FIG. 1.

The weights A and B used in the balancing apparatus are adapted for actuation by the longitudinal displacing movements of the slide 7 and rod 14, in such a manner, that the first weights are actuated by the first wheel and the rod 14, and the second weights by the second wheel and the slide 7. The first weights $A_1$ and $A_2$ are secured on the ends of an axle 33 connecting said weights. As shown in FIG. 2, the axle 33 extends perpendicularly to the axis of rotation 34 of the apparatus. The first weights and their connecting axle are mounted on ball bearings 36 on first bearing axles 35 which are fastened in the housing by screws. The axles 33 extend perpendicular to the axis of rotation, so that the rotation of the connecting axle with the associated weights takes place strikingly easily without friction. The first weights $A_1$ and $A_2$ are substantially shaped as discs or corresponding members parallel with each other and secured eccentrically on the connecting axle 33. Upon rotation of said connecting axle and weights about the first bearing axles 35, the common center of gravity of the first weights will be displaced relatively to a plane through the axis of rotation which coincides with the Figure plane in FIG. 1.

The second weights $B_0$, $B_1$ and $B_2$ together form a bow with weights $B_1$ and $B_2$ constituting the legs of the bow and the weight $B_0$ constituting its intermediate portion. The support of the weights or bow is designed so at the free ends of the legs an eccentric suspension is obtained. The bow is supported on second bearing axles 35 via ball bearings 38'. The second bearing axles are fastened in the housing 2 by means of the screws 39' and extend perpendicularly not only in relation to the axis of rotation 34 shown in FIG. 1 but also to the first bearing axles 37. Because the ball bearings 38' are used the bow is easily rotatable about the second bearing axles 35. The common center of gravity of the second weights is, upon rotation of the bow, displaced relative to a plane extending through the axis of rotation and perpendicular to the Figure plane in FIG. 1. The bow legs, or the weights $B_1$ and $B_2$, are substantially shaped as mutually parallel discs connected to the tapering intermediate portion or weight $B_0$ and the intermediate portion is given a substantially square cross-section, one diagonal shown in FIG. 1 coincides with the rotation axis 34 in the starting position of the bow. The bow can be rotated to two maximum actuation positions, one upper position indicated by a dashed line in FIG. 1, and a lower position. In the maximum actuation positions, the intermediate portion of the bow or the weight $B_0$, is moved tightly adjacent to one or the other of the weights $A_1$ and $A_2$ and their connecting axle 33. In order to obtain an optimum movement in the bow, the intermediate portion is arranged so that two defining sides bound together in the cross-section will, upon rotation to the respective maximum actuation position, connect in parallel to the inner surface of the disc $A_1$ and $A_2$, respectively, and to the outer surface of the connecting axle 33. From the starting position for the bow, the cross-section of the intermediate portion is turned through about 45° during its movement to the respective maximum actuation position.

The rotation of the weights by means of the slide 7 and rod 14 is achieved by portions co-operating with the weights. The slide 7 comprises two portions 40 and 41 projecting from one of its ends and formed with toothed elements to form racks. The respective projecting portion on the slide 7 co-operates with gear wheels 42 or portions provided with toothed elements disposed adjacent the inner surfaces of the weights $B_1$ and $B_2$. The toothed elements on the rack 40 and the portion 42 with toothed elements at the weight $B_1$ are shown in FIG. 2 and designated as element 43. The slide 7 carries out its co-rotary motion with the housing 2 and outer rotation member 5 by the co-operation of its projecting portions with the portions formed with toothed elements at the weights $B_1$ and $B_2$.

The rod 14 is provided with a projecting end portion 44 formed with toothed elements so as to constitute a rack. The connecting axle 33 is formed at its central portions with a portion provided with corresponding toothed elements and extending entirely or partially about the periphery of the axle 33. The toothed elements on the rod 44 shown in FIG. 2 are designated as element 45 while the corresponding toothed elements in the axle 33 are designated as 46. The mounting for the rack 44 in the rod 14 is shown as element 47. The rod 14 carries its rotary motion for the axle 33 via the abutment of the projecting portion 44 to the axle 33. The toothed elements on the respective co-operating portions are given a shape and pitch rendering it possible for the weights to be rotated easily, and at the same time the weights are held distinctly in their positions imparted to them by the slide and rod, respectively. In order to insure that an unbalance occurring in the grinding wheel or corresponding part will not affect a setting, the first and second wheels are provided with a locking member (not shown), which is activated after a balancing is carried out with the wheels in question.

The apparatus comprises, in addition to the components described above, locking rings and associated locking keys for the bearings 6 and 26. The bearing 29 is fixed by means of a locking edge on the second control wheel. The respective wheel is made in two parts held together by screw-connections indicated in the figures in a symbolic manner. Certain units in the apparatus, furthermore, are held together by additional screw-connections indicated in a corresponding manner.

Clockwise rotation of the first wheel 19 from the starting position as shown in the Figures, causes the rod 14 to be pulled against the wheel, whereby the axle 33 shown in FIG. 3 is rotated clockwise. Counter-clockwise rotation of the first wheel from the starting position shown effects an opposed rotation of the axle 33 and its associated weights. Corresponding movements from the starting position shown are obtained for the bow upon rotation of the second wheel 23.

At the embodiment shown, the first and second screws 20 and 24 have dimensions corresponding to M8 and M20, respectively. The screw diameter can, without inconvenience, be reduced, for example, to M4 and M10, respectively. The screw diameter for the first screw preferably is chosen to be 5–10% of the diameter of the first wheel, while the screw diameter for the second screw is chosen to be 10–20% of the diameter of the second wheel. The wheel may also be provided with a tool-engaging means (not shown). When dimensioning the apparatus for a rotation speed of up to 5000 rpm and a service life of 4000 operation hours, a dynamic bearing capacity in the axial bearings (not shown) of about 1500 kp should be chosen. The apparatus further comprises a protective hood (not shown), which prevents foreign particles from penetrating into the bearings.

Also, the wheels 19 and 23 may alternatively be exchanged against gear wheels or corresponding means adapted to be driven by motors of a suitable kind attached adjacent the apparatus. Such motors may be designed in a manner known per se so as to be controlled in both rotation directions by actuating means, for example in the form of push buttons or the like.

The invention is not restricted to the embodiment described above and shown by way of example, but may be modified within the scope of the attached claims. The different components in the apparatus can, for example, be varied substantially with respect to their design.

I claim:

1. In an apparatus usable with a rotatable object such as a grinding wheel, to balance an object during its rotation, having members mounted co-rotary with the object, members mounted non-co-rotary therewith, a plurality of weights ($A_1$, $A_2$, $B_0$, $B_1$ and $B_2$) coupled to the co-rotary members, said weights having their respective centers of gravity arranged displaceable relative to planes through the axis of rotation (34) of the object, actuating means coupled to the weights and supported by the non-co-rotary members, said actuating members displaceable along the axis of rotation, said weights being adapted for rotation about a pair of axles (35, 37), said axles extending angularly in relation to the axis of rotation (34), co-operating portions (44, 43 and 40, 41, 42) on said actuating means and weights provided with toothed elements (43, 45), by which rotation of the weights is effected, the improvement comprising: two of said plurality of weights ($A_1$, $A_2$) defining a first group of weights, and each of disc-shape and connected to each other by a central rotation axle (37), two of said plurality of weights ($B_1$, $B_2$), defining a second group of weights, and each of disc-shape and connected to each other by an intermediate bow portion ($B_0$) offset from a rotation axle (35) for said second group, wherein the rotation axles (35, 37) of said first and second weights form substantially right angles with each other and with the rotation axis (34) of the rotary object, and the rotation axles (37, 35) of said first and second weights are located substantially in the same plane.

2. An apparatus according to claim 1, wherein the first and second groups of weights are adjustable by means of axially displaceable rack-like elements (44, 40) co-operating with gear wheel-like elements (46, 42) on the weights.

3. An apparatus according to claim 1, wherein the axial displacement of the weights is effected by slides (13, 7) having ball bearing elements (9, 15) between co-rotary and non-co-rotary members.

4. An apparatus according to claim 3, wherein the slides (13, 7) are displaceable by means of manually rotatable wheels (23, 19) actuating the slides by screw-nut elements (20, 25).

* * * * *